US010121358B2

(12) United States Patent
Park

(10) Patent No.: US 10,121,358 B2
(45) Date of Patent: Nov. 6, 2018

(54) WIRELESS EMERGENCY BELL CONTROL SYSTEM AND METHOD, AND COMPUTER-READABLE RECORDING MEDIUM

(71) Applicant: Sang Rae Park, Seoul (KR)

(72) Inventor: Sang Rae Park, Seoul (KR)

(*) Notice: Subject to any disclaimer, the term of this patent is extended or adjusted under 35 U.S.C. 154(b) by 0 days.

(21) Appl. No.: 15/116,139

(22) PCT Filed: Jan. 30, 2015

(86) PCT No.: PCT/KR2015/001008
§ 371 (c)(1),
(2) Date: Aug. 2, 2016

(87) PCT Pub. No.: WO2015/115857
PCT Pub. Date: Aug. 6, 2015

(65) Prior Publication Data
US 2017/0206774 A1 Jul. 20, 2017

(30) Foreign Application Priority Data
Feb. 3, 2014 (KR) .................. 10-2014-0012087

(51) Int. Cl.
G08B 25/10 (2006.01)
G08B 7/06 (2006.01)
(Continued)

(52) U.S. Cl.
CPC .............. G08B 25/10 (2013.01); G08B 3/00 (2013.01); G08B 3/1008 (2013.01);
(Continued)

(58) Field of Classification Search
CPC .... H04L 65/4061; H04M 1/2535; H04W 4/10
See application file for complete search history.

(56) References Cited

U.S. PATENT DOCUMENTS

2005/0111629 A1* 5/2005 Carlson ............... H04M 3/2281
379/35
2009/0252302 A1* 10/2009 Monroe ........... G08B 13/19634
379/37
(Continued)

FOREIGN PATENT DOCUMENTS

KR 10-2009-0111140 A 10/2009
KR 10-1005795 B1 1/2011
(Continued)

Primary Examiner — Laura Nguyen
(74) Attorney, Agent, or Firm — NSIP Law

(57) ABSTRACT

Embodiments of the present invention relate to a wireless emergency bell and a method for controlling a wireless emergency bell installed in a school and a school zone, the method comprising the steps of: receiving an input signal generated by pressing a provided button by a reporter when an emergency situation occurs; generating an emergency bell signal, repeatedly transmitting the generated emergency bell signal to at least one pager and a receiver during a predetermined configuration time, and outputting a pre-stored alarm sound to the outside through a provided speaker; generating an emergency bell voice signal and transmitting the generated emergency bell voice signal to the at least one pager and the receiver; generating an emergency bell voice transmission completion signal indicating that the emergency bell voice signal has been completely transmitted, and transmitting the generated emergency bell voice transmission completion signal to the at least one pager and the receiver; converting an operation of the wireless emergency bell into a reception mode in which data can be automatically received from at least one pager after a configured time; receiving a pager voice signal from the at least one pager; determining whether the received pager voice signal exists, and outputting the received pager voice signal to the outside through the speaker when the received pager voice signal exists; and determining whether a mode (Continued)

conversion command signal is received from the at least one pager when the received pager voice signal does not exist, and converting the operation of the wireless emergency bell into a transmission mode in which data can b e transmitted to the at least one pager and the receiver when there is the received mode conversion command signal.

25 Claims, 10 Drawing Sheets

(51) Int. Cl.
  *G08B 3/10*   (2006.01)
  *G08B 3/00*   (2006.01)
  *G08B 13/196*  (2006.01)
  *G08B 21/02*  (2006.01)
  *G08B 25/12*  (2006.01)
  *H04B 5/00*   (2006.01)

(52) U.S. Cl.
  CPC ......... *G08B 3/1016* (2013.01); *G08B 3/1066* (2013.01); *G08B 7/06* (2013.01); *G08B 13/19669* (2013.01); *G08B 21/02* (2013.01); *G08B 25/12* (2013.01); *H04B 5/0056* (2013.01)

(56) References Cited

U.S. PATENT DOCUMENTS

| | | | | |
|---|---|---|---|---|
| 2012/0155348 | A1* | 6/2012 | Jacobson | H04L 12/10 370/311 |
| 2014/0295919 | A1* | 10/2014 | Inami | H04M 1/0235 455/566 |
| 2015/0373510 | A1* | 12/2015 | Stojanovski | H04W 36/14 370/312 |
| 2016/0295388 | A1* | 10/2016 | Vasic | G08B 25/001 |
| 2017/0027787 | A1* | 2/2017 | Huster | A61B 5/1115 |
| 2017/0084166 | A1* | 3/2017 | McNutt | G08B 25/12 |

FOREIGN PATENT DOCUMENTS

| | | | |
|---|---|---|---|
| KR | 10-2012-0069039 | A | 6/2012 |
| KR | 101172034 | B1 * | 8/2012 |
| KR | 10-1354625 | B1 | 1/2014 |

\* cited by examiner

WIRELESS EMERGENCY BELL CONTROL SYSTEM AND METHOD, AND COMPUTER-READABLE RECORDING MEDIUM

CROSS REFERENCE TO RELATED APPLICATIONS

This application is the National Phase of PCT International Application No. PCT/KR2015/001008, filed on Jan. 30, 2015, which claims priority under under 35 U.S.C. 119(a) to Patent Application No. 10-2014-0012087, filed in Republic of Korea on Feb. 3, 2014, all of which are hereby expressly incorporated by reference into the present application.

TECHNICAL FIELD

Embodiments of the present invention relate to a wireless emergency bell, for example, a system, a method, and a computer-readable recording medium for controlling a wireless emergency bell, capable of reporting that an emergency such as school violence, an emergent state, etc. occurs and responding thereto when an emergency occurs inside or near a school.

BACKGROUND ART

General security systems are installed in areas which lack security to report the occurrence of an emergency such as violence, an emergent state, etc. and respond thereto. Security systems include cameras installed in areas with vulnerable security and a camera controlling apparatus for controlling cameras. Each of cameras transmits images taken at an area with vulnerable security to the camera controlling apparatus in real time, and a user monitors each of images output on a display apparatus provided in the camera controlling apparatus and recognizes and determines whether an emergency occurs. Camera-based security systems have a problem that a time consumed for responding to the emergency varies according to abilities of users for recognizing the occurrence of an emergency. Accordingly, recently, there has been applied a technology in which a camera controlling apparatus of a camera-based security system performs image recognition processing on an image transmitted from each of cameras, detects each of objects in the received image, compares a relationship between detected objects with prestored situation data to automatically determine whether an emergency occurs. However, when predetermined situation data does not correspond to the relationship between the detected objects, the camera determines that an emergency does not occur. Also, since the camera controlling apparatus determines an emergency based on a signal of an image taken and transmitted by a camera, it is impossible to respond to an emergency which occurs in a dead zone for cameras.

Meanwhile, recently, measures for preventing school violence are social issues. Conventional camera-based security systems can not recognize an emergency such as school violence, an emergent state, etc. which occurs in a dead zone for cameras. However, a plurality of wireless emergency bells of a wireless emergency bell control system may be installed in areas with vulnerable security without constraints of space, thereby removing a blind spot of security. When an emergency occurs, a party to an accident or a person who recognizes the emergency may spread or report the occurrence of the emergency to others through an installed emergency bell. The wireless emergency bell control system, unlike security systems based only on cameras described above, may immediately determine whether an emergency occurs and may immediately respond to the emergency.

DISCLOSURE OF THE INVENTION

Technical Problems

Embodiments of the present invention provide a system, a method, and a computer-readable recording medium for controlling a wireless emergency bell, capable of immediately recognizing an emergency which occurs in or near a school.

Embodiments of the present invention also provide a system, a method, and a computer-readable recording medium for controlling a wireless emergency bell, which has a wireless communication range including not only a school but also surroundings thereof to control an emergency which occurs in or near a school.

Embodiments of the present invention also provide a system, a method, and a computer-readable recording medium for controlling a wireless emergency bell, capable of allowing an emergency bell and a pager to mutually transmit and receive voice data when an emergency signal is generated by the emergency bell.

Embodiments of the present invention also provide a system, a method, and a computer-readable recording medium for controlling a wireless emergency bell, capable of reducing power consumption of a pager by controlling a reception stand-by mode of the pager.

Embodiments of the present invention also provide a system, a method, and a computer-readable recording medium for controlling a wireless emergency bell, capable of interconnecting with a camera-based security system.

Embodiments of the present invention also provide a system, a method, and a computer-readable recording medium for controlling a wireless emergency bell, capable of removing a dead zone of security in or near a school.

Technical Solutions

According to one aspect of the present invention, a method of controlling a wireless emergency bell installed in a school and a school zone includes receiving an input signal generated by a reporter pushing a button when an emergency occurs, generating and repeatedly transmitting an emergency bell signal to at least one pager and a receiver for a preset setting time and outputting a prestored alarm sound to the outside through a provided speaker, generating and transmitting an emergency bell voice signal to the at least one pager and the receiver, generating and transmitting an emergency bell voice transmission completion signal which indicates that transmission of the emergency bell voice signal is completed to the at least one pager and the receiver, automatically converting an operation of the wireless emergency bell into a reception mode capable of receiving data from the at least one pager and the receiver, receiving a pager voice signal from the at least one pager, determining whether the received pager voice signal is present and outputting the received pager voice signal to the outside through the speaker when the received pager voice signal is present, determining whether a mode conversion command signal is received from the at least one pager when the received pager voice signal is not present and converting the operation into a transmission mode capable of transmitting data to the at least one pager and the receiver when the received mode conversion command signal is present.

The receiving of the input signal may further include receiving the input signal input by the reporter tagging a radio frequency (RF) tag to an RF reader provided at the wireless emergency bell.

The receiving of the input signal may further include receiving the input signal input by the reporter tagging a near field communication (NFC) tag to an NFC reader provided at the wireless emergency bell.

The emergency bell signal may include at least one of identification information of the reporter included in the RF tag and identification information of the reporter included in the NFC tag.

The emergency bell signal may be generated while including wireless emergency bell number information prestored in a storage portion provided at the wireless emergency bell to allow a security officer to recognize an area where the emergency occurs.

The emergency bell voice signal may be generated from a voice and sound input through a microphone provided at the wireless emergency bell.

The mode conversion command signal may include information which gives commands for converting the wireless emergency bell which operates in the reception mode into the transmission mode.

In the method, the at least one wireless emergency bell, the at least one pager, and the receiver may mutually communicate using at least one of ultrahigh frequency (UHF) bands which do not need report or permission.

The UHF band may have a frequency band range of 448 MHz or more and 449 MHz or less.

The receiving of the input signal may further include generating an image storage command signal including information which indicates a command for storing an image taken by a camera installed in an area from which the input signal is received and transmitting the generated image storage command signal to the camera connected through wires or wirelessly.

According to another aspect of the present invention, a method of controlling a wireless emergency bell installed in a school or a school zone includes at least one pager which performs entering a reception stand-by mode for receiving data from the wireless emergency bell or other pagers, determining whether an emergency bell signal which indicates that an emergency occurs is received from the wireless emergency bell and outputting a preset alarm sound to the outside through a provided speaker when the emergency bell signal is received, receiving an emergency bell voice signal from the wireless emergency bell and outputting the emergency bell voice signal to the outside through the speaker, determining whether an emergency bell voice transmission completion signal which indicates that transmission of the emergency bell voice signal is completed is received from the wireless emergency bell, and when the emergency bell voice transmission completion signal is received, receiving an input signal of a user which indicates whether a pager voice signal is received and determining whether transmission of the pager voice signal is necessary, generating and transmitting the pager voice signal to at least one of the wireless emergency bell, the other pagers, and the receiver when the transmission of the pager voice signal is necessary, and determining whether reception of the emergency bell voice signal is necessary by receiving the input signal of the user which indicates whether the emergency voice signal is received, and when the reception of the emergency bell voice signal is necessary, generating and transmitting a mode conversion command signal which includes information which gives commands for converting an operation mode of the wireless emergency bell from a reception mode into a transmission mode to the wireless emergency bell.

The entering of the reception stand-by mode may further include operating in a sleep mode for a preset setting time, operating, after the setting time is finished, in auto-polling for a preset setting time, and repeatedly performing the sleep mode and the auto-polling.

The at least one pager may further perform extracting emergency bell number information included in the emergency bell signal when the emergency bell signal is received, extracting identification information of the reporter when the identification information of the reporter is included in the received emergency bell signal, and displaying the extracted emergency bell number information or the extracted identification information of the reporter on a provided display portion to allow a security officer to recognize.

The displaying through the display portion may be displaying as at least one of a text, a symbol, a figure, and an icon.

The at least one pager may further perform extracting, when a plurality of such emergency bell signals are received, each piece of emergency bell number information included in the plurality of emergency bell signals in a reception order, generating an emergency bell number text which indicates the extracted each piece of emergency bell number information and a sequence text which indicates the reception order, and displaying the generated emergency bell number text and the generated sequence text to be different in at least one of size, font, and color through a provided display portion.

The input signal of the user may be generated by pushing one of a plurality of buttons provided at the pager.

In the method, the at least one wireless emergency bell, the at least one pager, and the receiver may mutually communicate using at least one of UHF bands which do not need report or permission.

The UHF band may have a frequency band range of 448 MHz or more and 449 MHz or less.

According to another aspect of the present invention, a method of controlling a wireless emergency bell installed in a school and a school zone includes a receiver which performs outputting a prestored alarm sound to the outside through a provided speaker when an emergency bell signal is received from at least one wireless emergency bell, receiving an emergency bell voice signal from the wireless emergency bell and outputting the received voice signal to the outside through the speaker, receiving a pager voice signal from at least one pager which wirelessly communicates with the wireless emergency bell and outputting the received pager voice signal to the outside through the speaker, and receiving and outputting pager voice signals transmitted and received between the at least one pager and another pager to the outside through the speaker.

The receiver may further perform extracting, when the emergency bell signal is received, emergency bell number information included in the emergency bell signal and displaying the extracted emergency bell number information on a provided display portion to allow a security officer to recognize, generating an image storage command signal including information which indicates a command for storing an image taken by a closed-circuit television (CCTV) camera installed in an area in which the wireless emergency bell is positioned, and transmitting the generated image storage command signal to a CCTV camera controlling apparatus which controls the CCTV camera which is connected through wires or wirelessly.

The receiver may further perform extracting emergency bell number information included in the emergency bell signal when the emergency bell signal is received, extracting identification information of the reporter when the identification information of the reporter is included in the received emergency bell signal, and displaying the extracted emergency bell number information or the extracted identification information of the reporter on a provided display portion to allow a security officer to recognize.

The displaying through the display portion may be displaying as at least one of a text, a symbol, a figure, and an icon.

The at least one wireless emergency bell, the at least one pager, and the receiver may mutually communicate using at least one of UHF bands which do not need report or permission.

The UHF band may have a frequency band range of 448 MHz or more and 449 MHz or less.

Meanwhile, information on the method described above may be stored in a computer-readable recording medium. The recording medium all types of recording media in which programs and data are stored to be readable by a computer system. For example, there are a read only memory (ROM), a random access memory (RAM), a compact disk (CD), a digital video disk (DVD)-ROM, a magnetic tape, a floppy disk, an optical data storage device, an embedded multimedia card (eMMC), etc. Also, in the recording medium, codes which are distributed in computer systems connected through a network and readable by a computer in a distribution method may be stored and executed.

Advantageous Effects

According to embodiments of the present invention, at least one of ultrahigh frequency (UHF) bands which do not need report or permission is used as a communication band to provide a communication radius from 500 m to 2 km, thereby controlling emergencies which occur not only in schools but also near schools.

Also, according to embodiments of the present invention, when an emergency occurs, an emergency bell and a pager mutually transmit and receive voice data to prevent damage of a victim in an emergency from increasing and to report a movement situation of a security to the victim.

Also, according to embodiments of the present invention, power consumption while being on standby may be reduced by using an auto-polling method in which a sleep mode and an auto-polling active state are included as a reception stand-by mode state of a pager.

Also, according to embodiments of the present invention, images before or after the occurrence of an emergency may be stored and provided interconnecting with a camera-based security system.

BEST MODE FOR THE INVENTION

Figure 1:
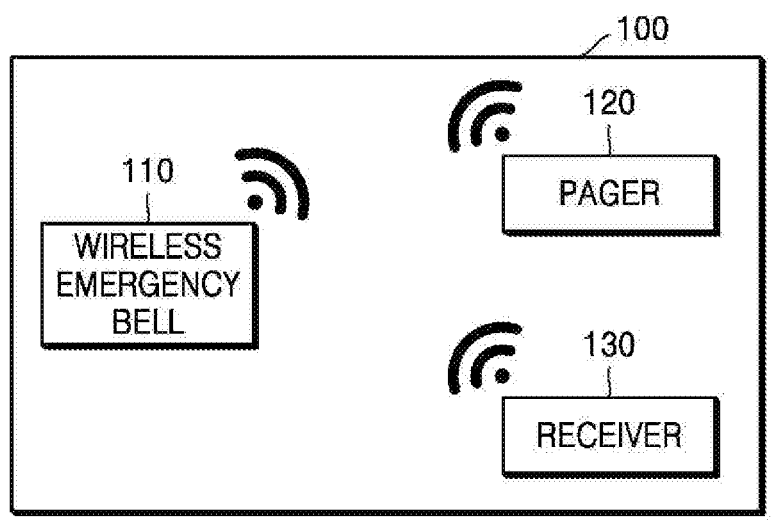
FIG. 1 is a block diagram of a wireless emergency bell control system according to one embodiment of the present invention.

Hereinafter, exemplary embodiments of the present invention will be described in detail with reference to contents illustrated in the attached drawings. However, the present invention is not limited to or defined by the exemplary embodiments. Throughout the drawings, like reference numerals designate like members which substantially perform the same functions.

Although the terms "first", "second", etc. may be used herein to describe various components, these components should not be limited by these terms. These terms are used only to distinguish one component from another. For example, without departing from the scope of the present invention, a first component may be designated as a second component, and similarly, the second component may be designated as the first component. Terms are used herein only to describe particular embodiments but do not intend to limit the present invention. Singular expressions, unless contextually otherwise defined, include plural expressions.

Although terms generally used now are selected as the terms used herein considering functions in the present invention as possible, these may vary according to intentions of one of ordinary skill in the art, practices, the advent of new technology, etc. Also, in particular cases, there are present terms randomly selected by an applicant. In this case, meanings thereof will be described in detail in a section of a description of the present invention corresponding thereto. Accordingly, the terms used herein should be defined, not as simple designations of the terms, based on the meanings of the terms and the content throughout the present invention.

Throughout the specification, it should be understood that when it is stated that a part "comprises" or "has" a component, unless particularly defined otherwise, the part does not preclude other components but may further include other components. Also, the terms "portion", "module", etc. specified herein mean a unit which performs at least one function or operation and may be embodied as hardware, software, or a combination of hardware and software.

First, for understanding a system, a method, and a computer-readable recording medium for controlling a wireless emergency bell according to one embodiment of the present invention, terms will be described as follows.

A storage portion or a recording medium according to one embodiment of the present invention includes all kinds of recording media which store a program and data to be read by a computer system. As examples thereof, a read only memory (ROM), a random access memory (RAM), a compact disk (CD), a digital video disk (DVD)-ROM, a magnetic tape, a floppy disk, an optical data storage device, an embedded multimedia card (eMMC), a hard disk drive (HDD), a micro secure digital (SD) card, a universal serial bus (USB), etc. Also, being embodied as a carrier wave (for example, transmission over the Internet) is included.

A camera management device according to one embodiment of the present invention is a mobile terminal which is portable and capable of transmitting and receiving data with a camera through a local area wireless communication method and may be a random electronic apparatus which includes at least one display portion and at least one recording medium.

The camera management device described above may be a smart phone, a cellular phone, a wearable head unit, a tablet, a notebook computer, a personal media player (PMP), personal digital assistants (PDA), etc. Also, the camera management device may be a flexible apparatus or a flexible display apparatus.

A display portion according to one embodiment of the present invention includes an electroluminescent display (ELD), a vacuum fluorescent display (VFD), a light-emitting diode display (LED), a cathode-ray tube (CRT), a liquid crystal display (LCD), a thin film transistor liquid crystal display (TFT LCD), a plasma display panel (PDP), alternate lighting of surfaces (ALiS), a digital light processing (DLP), a liquid crystal on silicon (LCoS), an organic light emitting diode (OLED), a surface-conduction electron-emitter display (SED), a field emission display (FED), a laser TV (quantum dot laser and liquid crystal laser), ferroelectric liquid crystal display (FLD), an interferometric modulator display (iMoD), thick-film dielectric electroluminescent (TDEL), a quantum dot display (QD-LED), a telescopic pixel display (TPD), an organic light emitting transistor (OLET), a laser phosphor display (LPD), etc.

A closed-circuit television (CCTV) camera according to one embodiment of the present invention may be controlled by a CCTV camera controlling apparatus and may be installed in an area in which a wireless emergency bell is installed.

When an image storage command signal is received from a receiver, the CCTV camera controlling apparatus according to one embodiment of the present invention may extract emergency bell number information from the received image storage command signal and may recognize image information by controlling at least one of pan, tilt, and zoom functions of a CCTV camera positioned in an area in which an emergency occurs. The CCTV camera controlling apparatus may record image information transmitted from the CCTV camera installed in a corresponding area within a preset setting range based on a time when the image storage command signal in the image information is received.

Hereinafter, a wireless emergency bell control system according to one embodiment of the present invention will be described with reference to the attached drawings.

FIG. 1 is a block diagram of a wireless emergency bell control system according to one embodiment of the present invention. Referring to FIG. 1, a wireless emergency bell control system 100 may include at least one wireless emergency bell 110, at least one pager 120, and a receiver 130.

The at least one wireless emergency bell 110 is installed in an area which needs security, and each wireless emergency bell 110 prestores emergency bell number information. The emergency bell number information is unique number information stored in each of a plurality of such wireless emergency bells, and the respective wireless emergency bells 110 store different number information to distinguish from one another.

Also, when an input signal of a reporter input through an input/output portion (not shown) is received, the wireless emergency bell 110 may output an alarm sound for a preset setting time to allow people around there to recognize that an emergency occurs. The alarm sound and the setting time may be preset by a user or a manufacturer.

Also, when the input signal of the reporter input through the input/output portion, the wireless emergency bell 110 may recognize that the emergency occurs and may generate and repeatedly transmit an emergency bell signal including its own emergency bell number information to the pager 120 and the receiver 130 for a preset setting time using a wireless communication method Also, the wireless emergency bell 110 may transmit the emergency bell signal to the pager 120 and the receiver 130 and then may communicate with the pager 120 using the wireless communication method. For example, the wireless emergency bell 110 may receive a voice of the reporter and sounds around the wireless emergency bell 110 input through a microphone (not shown) provided therein and may generate an emergency bell voice signal. The wireless emergency bell 110 may transmit the emergency bell voice signal to the pager 120 and the receiver 130 using the wireless communication method.

Also, the wireless emergency bell 110 may generate an emergency bell voice transmission completion signal which indicates that transmission of the emergency bell voice signal is completed after transmitting the emergency bell voice signal to the pager 120. The wireless emergency bell 110 may transmit the emergency bell voice transmission completion signal to the pager 120 using the wireless communication method.

Also, the wireless emergency bell 110 may receive a mode conversion command signal transmitted from the pager 120 after transmitting the emergency bell voice transmission completion signal to the pager 120. For example, the wireless emergency bell 110 may determine whether the mode conversion command signal is received from the pager 120 while operating in a reception mode which is a mode for receiving a pager voice signal. As a result of the determination, when the mode conversion command signal is received from the pager 120, the wireless emergency bell 110 may convert from the existing reception mode into a transmission mode capable of transmitting the emergency bell voice signal and the emergency bell voice transmission completion signal and may operate. When the mode conversion command signal is not received from the pager 120, the wireless emergency bell 110 may finish wireless communication with the pager 120. The mode conversion command signal is a signal which is generated by the pager 120 and includes information for giving commands to mutually convert the reception mode and the transmission mode which are operation modes of the wireless emergency bell 110.

Also, at least one wireless emergency bell 110 may be installed in an area which needs security.

Also, a plurality of such wireless emergency bells 110, the at least one pager 120, and the at least one receiver 130 may mutually transmit and receive data using the wireless communication method.

Accordingly, the wireless emergency bell control system 100 according to one embodiment of the present invention may provide a security system with no dead zone of security by installing each of the wireless emergency bell 110 in each of areas with vulnerable security in or near a school.

The pager 120 may receive an emergency bell signal from at lest one of the plurality of wireless emergency bells 110 installed in or near the school. When the emergency bell signal is received, the pager 120 may output an alarm sound for a preset setting time to allow a user to recognize it. The alarm sound and the setting time may be preset by a user or a manufacturer.

Also, the pager 120 may recognize the wireless emergency bell 110 which transmits the emergency bell signal and an area in which the corresponding wireless emergency bell 110 is positioned from emergency bell number information included in the received emergency bell signal. The pager 120 may output the emergency bell number information included in the received emergency bell signal through a provided display portion (not shown) to allow a security officer to recognize the area in which the wireless emergency bell 110 which transmits the emergency bell signal. Accordingly, the security officer may individually distinguish the area in which an emergency occurs and the wireless emergency bell 110 which transmits the emergency bell signal is installed from security areas in which at least one wireless emergency bell 110 is installed through the pager 120 and the receiver 130.

Also, when emergency bell signals are received from the plurality of wireless emergency bells 110, the pager 120 may sequentially obtain pieces of emergency bell number information from the received emergency bell signals. The pager 120 may sequentially output the pieces of obtained emergency bell number information through the provided display portion for each record at a reception time. An outputting method of the display portion of the pager 120 will be described below in detail with reference to FIG. 6.

Also, the pager 120 may determine whether an emergency bell voice transmission completion signal is received from the wireless emergency bell 110. As a result of the determination, when the emergency bell voice transmission completion signal is received, the pager 120 may receive a user input signal through a provided input/output portion (not shown) and may determine whether transmission of a pager voice signal is necessary. As a result of the determination, when the transmission of the pager voice signal is necessary, the pager 120 may generate the pager voice signal by receiving a user voice through a provided microphone (not shown) and may transmit the generated pager voice signal to the wireless emergency bell 110 using a wireless communication method.

Also, after transmitting the pager voice signal to the wireless emergency bell 110, the pager 120 may receive the user input signal through the provided input/output portion and may determine whether reception of an emergency bell voice signal is necessary. As a result of the determination, when the reception of the emergency bell voice signal is necessary, the pager 120 may generate a mode conversion command signal including information for giving commands to convert the operation mode of the wireless emergency bell 110 from the reception mode into the transmission mode. The pager 120 may transmit the generated mode conversion command signal to the wireless emergency bell 110 using a wireless communication method.

Also, at least one pager 120 may be included in the wireless emergency bell control system 100 depending on characteristics of an area in which the wireless emergency bell control system 100 is installed. For example, each of security officers who reside in a school may carry one pager 120.

Also, in the wireless emergency bell control system including a plurality of such pagers 120, the respective pagers 120 may mutually transmit and receive data using a wireless communication method. For example, to allow a security officer positioned at a nearest place to an area in which an emergency occurs to immediately handle the emergency, security officers may mutually transmit and receive data using the pagers 120 carried by them through wireless communication with other wireless emergency bells 110 or other pagers 120.

Also, the receiver 130 may recognize the wireless emergency bell 110 which transmits an emergency bell signal and an area in which the corresponding wireless emergency bell 110 is positioned from emergency bell number information included in the received emergency bell signal.

Also, the pager receiver 130 may output the emergency bell number information included in the received emergency bell signal through a provided display portion (not shown) to allow a user to recognize the area in which the wireless emergency bell 110 which transmits the emergency bell signal.

Also, when the plurality of pagers 120 mutually transmit and receive data, the receiver 130 may output information which indicates that communication is performed among the pagers 120 through the provided display portion to allow a worker in a situation room (for example, a teachers' room or a management office) in which the receiver 130 is installed to recognize it. An outputting method of the display portion of the receiver 130 will be described below in detail with reference to FIG. 8.

The wireless emergency bell 110, the pager 120, and the receiver 130 of the wireless emergency bell control system 100 may wirelessly transmit and receive using at least one of ultrahigh frequency (UHF) bands which do not need report or permission. For example, the wireless emergency bell control system 100 may provide a communication radius within a range from 500 m to 2 km using a wireless communication method using 400 MHz of a UHF band as a communication band. A band range of the wireless communication method may include bands 448 MHz or more and 449 or less. A transmission output of the wireless communication method may be randomly set. Frequency modulation, phase modulation methods, etc. may be used as a modulation method of the wireless communication method.

Figure 2:
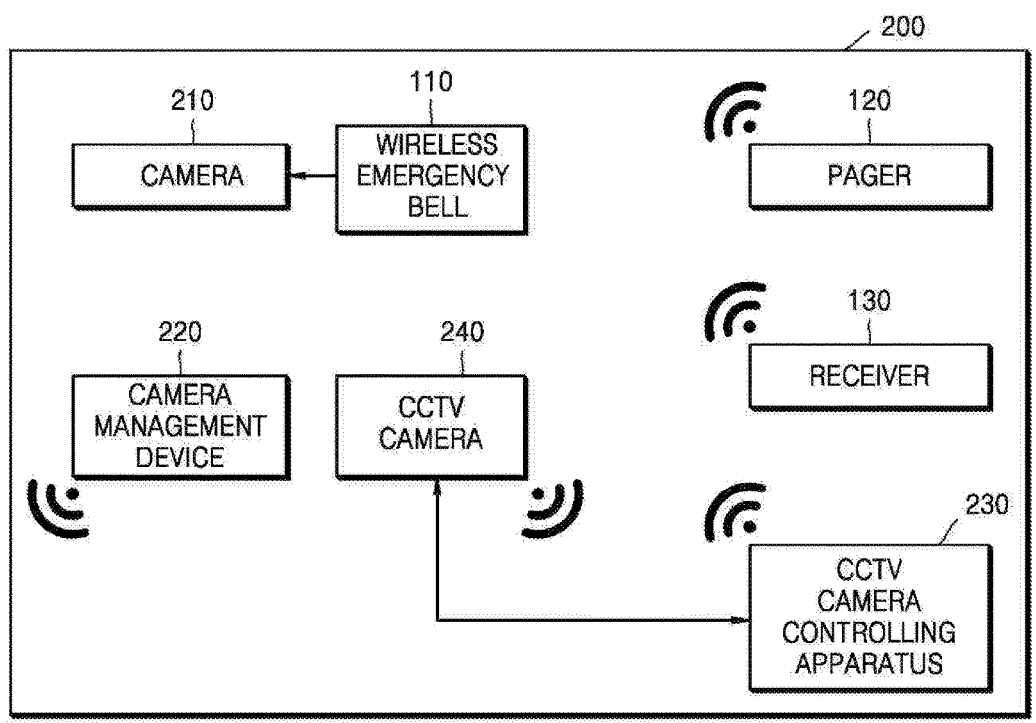
FIG. 2 is a block diagram of a wireless emergency bell control system according to another embodiment of the present invention.

FIG. 2 is a block diagram of a wireless emergency bell control system according to another embodiment of the present invention. Referring to FIG. 2, a wireless emergency bell control system 200 according to another embodiment of the present invention includes the at least one wireless emergency bell 110, the at lest one pager 120, and the receiver 130 which are elements of the wireless emergency bell control system 100 and may further include at least one camera 210, at least one camera management device 220, and a camera controlling apparatus 230. Since having been described in detail with reference to FIG. 1, a detailed description of the at least one wireless emergency bell 110, the at lest one pager 120, and the receiver 130 of the wireless emergency bell control system 100 will be omitted. As follows, the camera 210, the camera management device 220, the closed-circuit television (CCTV) camera controlling apparatus 230, and a CCTV camera 240 will be described in detail.

The camera 210 may take and record an image around the wireless emergency bell 110. Each of the camera 210 and the wireless emergency bell 110 may include an input/output terminal (not shown). The input/output terminals of the camera 210 and the wireless emergency bell 110 may be mutually connected through wires or wirelessly to provide wired or wireless communication between the camera 210 and the wireless emergency bell 110.

Also, the camera 210 may receive an image storage command signal from the wireless emergency bell 110 through the wired or wireless communication. The image storage command signal is a signal which is generated by the wireless emergency bell 110 and includes information which indicates a command for storing an image taken in a corresponding area when an emergency occurs. For example, when an input signal is received from a reporter through the provided input/output terminal, the wireless emergency bell 110 may generate and transmit the image storage command signal to the camera 210 through the wired or wireless communication.

Also, when the image storage command signal is received from the wireless emergency bell 110, the camera 210 may record images within a preset setting range time based on a time when the image storage command signal is received. For example, when the image storage command signal is received, the camera 210 with a setting range time of 10 minutes may generate one event file by recording images from five minutes before receiving the image storage command signal to five minutes after receiving the image storage command signal and may store the generated event file in a provided storage portion (not shown). Information on the setting range time may be transmitted while being included in the image storage command signal. Also, the setting range time may be preset by a user or a manufacturer of the wireless emergency bell control system 200.

Also, the camera 210 may wirelessly communicate with the camera management device 220 through a communication module (not shown) provided in a local area using a local area communication method. The local area communication method may include Bluetooth, infrared data association (IrDA), wireless fidelity (Wi-Fi) direct communication, near field communication (NFQ), etc. The camera 210 may transmit image information which is recorded or image information which is being taken under the control of the camera management device 220 to the camera management device 220.

Also, at least one camera 210 may be installed in an area which needs security. For example, the camera 210 may be installed in the same area in which the wireless emergency bell 110 is installed or near the area, may generate image information by taking an image of the corresponding area, and may generate recorded image information by storing the image.

Also, the camera 210 may include the storage portion to store the image information.

Also, the camera 210 may record the image information together with voice information and sound information input through a provided microphone (not shown).

The camera management device 220 may receive and store the image information recorded by the camera 210 or the image information which is being taken from the camera 210 using a local area wireless communication method. For example, the user may check images of surroundings of the wireless emergency bell 110 in the area in which the emergency occurs using the camera management device 220.

Also, the camera management device 220 may provide a function of allowing the user to edit the image information received from the camera 210 and stored.

Also, the camera management device 220 may provide a function of allowing the user to delete the image information received from the camera 210 and stored or the image information stored in the storage portion provided at the camera 210.

Also, the camera management device 220 may provide a function of allowing the user to format a storage medium (not shown) provided at the camera 210.

The CCTV camera controlling apparatus 230 may be connected to at least one CCTV camera 240 though wires or wirelessly, may receive image information transmitted from the CCTV camera 240 and may record the received image information in a provided storage portion (not shown).

Also, each of the CCTV camera controlling apparatus 230 and the receiver 130 may include an input/output terminal (not shown). The input/output terminals of the camera management device 230 and the receiver 130 may be mutually connected through wires or wirelessly to provide wired or wireless communication between the camera management device 230 and the receiver 130.

Also, the CCTV camera management device 230 may receive an image storage command signal from the receiver 130 through the wired or wireless communication. The image storage command signal is a signal which is generated by the receiver 130 and includes information which indicates a command for storing an image taken in a corresponding area when an emergency occurs. The image storage command signal may be generated by the receiver 130 while including emergency bell number information. For example, when an input signal is received from a reporter through the provided input/output terminal, the wireless emergency bell 110 may generate and transmit an emergency bell signal including the emergency bell number information to the receiver 130 through the wired or wireless communication. The receiver 130 may extract the emergency bell number information included in the received emergency bell signal and may generate the image storage command signal including the extracted emergency bell number information. The receiver 130 may transmit the generated image storage command signal to the CCTV camera controlling apparatus 230 through wired or wireless communication.

When the image storage command signal is received, the CCTV camera controlling apparatus 230 may extract the emergency bell number information from the received image storage command signal and may control at least one of pan, tilt, and zoom functions of the CCTV camera 240 positioned in an area in which an emergency occurs to record image information within a preset setting range time based on a time when the image storage command signal is received among the image information transmitted from the CCTV camera 240 installed in the corresponding area. For example, when the image storage command signal is received, the CCTV camera controlling apparatus 230 with a setting range time of 10 minutes may generate one event file by recording images from five minutes before receiving the image storage command signal to five minutes after receiving the image storage command signal and may store the generated event file in the provided storage portion. Information on the setting range time may be transmitted while being included in the image storage command signal.

Also, the setting range time may be preset by the user or the manufacturer of the wireless emergency bell control system 200.

Figure 3:
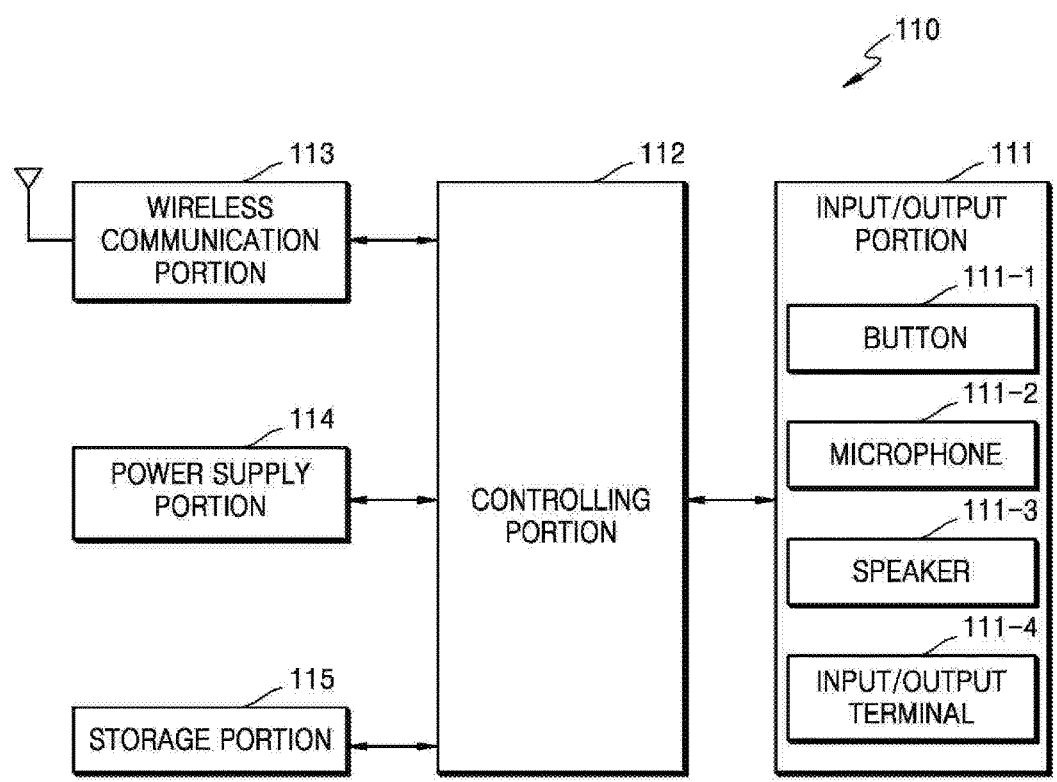
FIG. 3 is a block diagram of a wireless emergency bell of the wireless emergency bell control system according to one embodiment of the present invention.

FIG. 3 is a block diagram of the wireless emergency bell of the wireless emergency bell control system according to one embodiment of the present invention. Referring to FIG. 3, the wireless emergency bell 110 may include an input/output portion 111, a controlling portion 112, a wireless communication portion 113, a power supply portion 114, and a storage portion 115.

The input/output portion 111 may include at least one of a button 111-1, a microphone 111-2, a speaker 111-3, and an input/output terminal 111-4.

The button 111-1 may be formed on a front surface, a rear surface, a side surface, a top surface, or a bottom surface of a housing of the wireless emergency bell 110. When an emergency occurs, a reporter may report the occurrence of the emergency by pushing the button 111-1. The button 111-1 may receive an input of the user which is pushing the button 111-1 from the reporter and may generate and transmit an input signal which indicates that the button 111-1 is pushed to the controlling portion 112.

The microphone 111-2 may generate an electric signal by receiving a voice or sound under the control of the controlling portion 112. The microphone 111-2 may transmit the generated electric signal to the controlling portion 112.

The speaker 111-3 may output a pager voice signal received from the pager 120 to the outside of the wireless emergency bell 110 under the control of the controlling portion 112.

Also, the speaker 111-3 may output an alarm sound prestored in the storage portion 115 to the outside of the wireless emergency bell 110 under the control of the controlling portion 112. One or a plurality of such speakers 111-3 may be formed at an appropriate position or positions of the housing of the wireless emergency bell 110.

The input/output terminal 111-4 may be used as an interface for connecting external apparatuses such as the wireless emergency bell 110, a camera (not shown), etc. or a power source (not shown).

Also, the input/output portion 111 may further include at least one of a radio frequency (RF) reader (not shown) and a near field communication (NFC) reader (not shown).

The RF reader may be formed on the front surface, the rear surface, the side surface, the top surface, or the bottom surface of the housing of the wireless emergency bell 110. When an emergency occurs, the reporter may report the occurrence of the emergency by allowing an RF tag carried by the reporter to be recognized by the RF reader. When the RF tag is recognized, the RF reader may generate and transmit an input signal which indicates that the emergency occurs to the controlling portion 112. Identification information of the reporter which is stored in the RF tag may be included in the input signal generated by the RF reader due to the recognition of the RF tag. Accordingly, the controlling portion 112 of the wireless emergency bell 110 which receives the input signal including the identification information of the reporter may generate and transmit an emergency bell signal including the received identification information of the reporter to at least one of the pager 120 or the receiver 130.

The NFC reader may be formed on the front surface, the rear surface, the side surface, the top surface, or the bottom surface of the housing of the wireless emergency bell 110. When an emergency occurs, the reporter may report the occurrence of the emergency by allowing an NFC tag carried by the reporter to be recognized by the NFC reader. When the NFC tag is recognized, the NFC reader may generate and transmit an input signal which indicates that the emergency occurs to the controlling portion 112. Identification information of the reporter which is stored in the NFC tag may be included in the input signal generated by the NFC reader due to the recognition of the NFC tag. Accordingly, the controlling portion 112 of the wireless emergency bell 110 which receives the input signal including the identification information of the reporter may generate and transmit an emergency bell signal including the received identification information of the reporter to at least one of the pager 120 or the receiver 130.

The wireless communication portion 113 may allow the wireless emergency bell 110 to be connected to an external apparatus such as the pager 120 through wireless communication using at least one or a plurality of antennas under the control of the controlling portion 112 The wireless communication portion 113 may transmit at least one of an emergency bell signal, an emergency bell voice signal, and an emergency bell voice transmission completion signal to the pager 120 or the receiver 130 under the control of the controlling portion 112.

Also, the wireless communication portion 113 may receive at least one of a pager voice signal and a mode conversion command signal from the pager 120 under the control of the controlling portion 112.

Also, the wireless communication portion 113 may perform the wireless communication using at least one of UHF bands which do not need report or permission. For example, the wireless communication may be performed using UHF within a range of frequency band of 448 MHz or more and 449 MHz or less.

The power supply portion 114 may supply one or a plurality of batteries (not shown) disposed in the housing of the wireless emergency bell 110 under the control of the controlling portion 112. The one or the plurality of batteries supply power to the wireless emergency bell 110.

Also, the power supply portion 114 may supply power input from an external power source (not shown) to the wireless emergency bell 110 through a cable connected to the input/output terminal 111-4

Also, the power supply portion 114 may supply power wirelessly input from the external power source to the wireless emergency bell 110 using a wireless charging technology.

The storage portion 115 may store various types of data necessary for an operation of the wireless emergency bell 110 and data transmitted and received through the wireless communication portion 113 under the control of the controlling portion 112.

Also, when an emergency occurs, the storage portion 115 may transmit prestored alarm sound information to the controlling portion 112 under the controlling portion 112.

The controlling portion 112 may receive the input signal of the reporter through the button 111-1 provided at the input/output portion 111 when the emergency occurs.

After that, the controlling portion 112 may generate an emergency bell signal including emergency bell number information thereof. The controlling portion 112 may repeatedly transmit the generated emergency bell signal to the pager 120 or the receiver 130 through the wireless communication portion 113 for a preset setting time.

Also, the controlling portion 112 may extract the alarm sound information prestored in the storage portion 115 and may generate and output an alarm sound signal including the extracted alarm sound information to the outside of the wireless emergency bell 110 through the speaker 111-3 for a preset setting time. The emergency bell number information, the alarm sound information, and information on the setting time may be prestored in the storage portion 115.

After that, the controlling portion 112 may generate an emergency bell voice signal including an electric signal generated from a voice or sound received through the provided microphone 111-2. The controlling portion 112 may store the generated emergency bell voice signal in the storage portion 115. The controlling portion 112 may repeatedly transmit the generated emergency bell voice signal to the pager 120 or the receiver 130 through the wireless communication portion 113.

After that, the controlling portion 112 may generate an emergency bell voice transmission completion signal which indicates that transmission of the emergency bell voice signal is completed. The controlling portion 112 may repeatedly transmit the generated emergency bell voice transmission completion signal to the pager 120 or the receiver 130 through the wireless communication portion 113.

After that, the controlling portion 112 may convert an operation mode of the wireless emergency bell 110 into a reception mode for receiving data transmitted from the pager 120 through the wireless communication portion 113.

After that, the controlling portion 112 may receive a pager voice signal from the pager 120 through the wireless communication portion 113. The pager voice signal is a signal including an electric signal generated from a voice or sound input through the microphone provided in the pager 120.

After that, the controlling portion 112 may determine whether the received pager voice signal is present. As a result of the determination, when the received pager voice signal is present, the controlling portion 112 may output the received pager voice signal to the outside of the wireless emergency bell 110 through the speaker 111-3.

When the received pager voice signal is not present, the controlling portion 112 may determine whether a mode conversion command signal is received from the pager 120. When the mode conversion command signal is received, the controlling portion 112 may convert the operation mode of the wireless emergency bell 110 from the reception mode into a transmission mode. The wireless emergency bell 110 operating in the transmission mode may transmit data to the pager 120 or the receiver 130. When the mode conversion command signal is not received, the controlling portion 112 may finish the operation of the wireless emergency bell 110.

Figure 4:
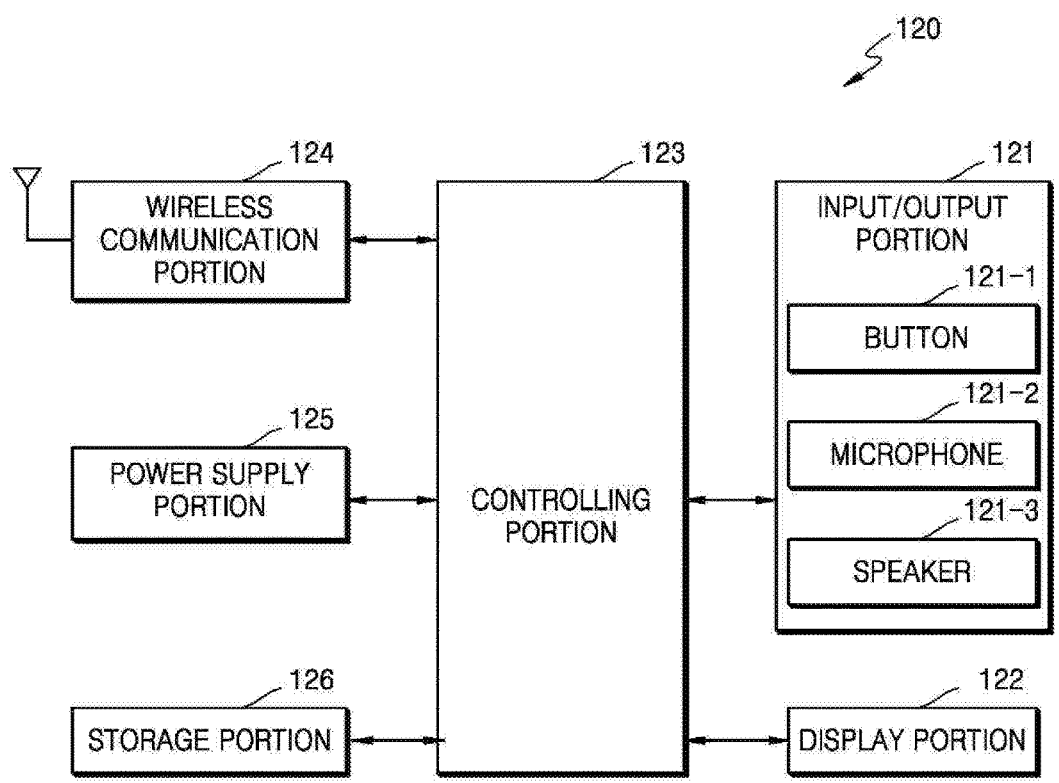
FIG. 4 is a block diagram of a pager of the wireless emergency bell control system according to one embodiment of the present invention.

FIG. 4 is a block diagram of the pager of the wireless emergency bell control system according to one embodiment of the present invention. Referring to FIG. 4, the pager 120 may include an input/output portion 121, a display portion 122, a controlling portion 123, a wireless communication portion 124, a power supply portion 125, and a storage portion 126.

The input/output portion 121 may include at least one of a button 121-1, a microphone 121-2, and a speaker 121-3.

One or a plurality of such buttons 121-1 may be formed on a front surface, a rear surface, a side surface, a top surface, or a bottom surface of a housing of the pager 120. The button 121-1 may include at least one of a call/response button (not shown), a power button (not shown), a menu button (not shown), an upper adjustment button (not shown), and a lower adjustment button (not shown).

The microphone 121-2 may generate an electric signal by receiving a voice or sound under the control of the controlling portion 123. The microphone 121-2 may transmit the generated electric signal to the controlling portion 123.

The speaker 121-3 may output an emergency bell voice signal received from the wireless emergency bell 110 to the outside of the pager 120 under the control of the controlling portion 123.

Also, the speaker 121-3 may output an alarm sound prestored in the storage portion 126 to the outside of the pager 120 under the control of the controlling portion 123. One or a plurality of such speakers 121-3 may be formed at an appropriate position or positions of the housing of the pager 120.

The display portion 122 may output emergency bell number information included in the emergency bell signal received from the wireless emergency bell 110 as at least one of a text, a symbol, a figure, and an icon under the control of the controlling portion 123 to allow a user to recognize the emergency bell number information.

The wireless communication portion 124 may allow the pager 120 to be connected to external apparatuses such as the wireless emergency bell 110 or other pagers 120 through wireless communication using at least one or a plurality of antennas under the control of the controlling portion 123 The wireless communication portion 124 may transmit at least one of a pager voice signal and a mode conversion command signal to the wireless emergency bell 110 or the other pagers 120 under the control of the controlling portion 123.

Also, the wireless communication portion 124 may receive at least one of an emergency bell voice signal and an emergency bell voice transmission completion signal from the wireless emergency bell 110 under the control of the controlling portion 123.

Also, the wireless communication portion 124 may receive the pager voice signals from the other pagers 120 under the control of the controlling portion 123.

Also, the wireless communication portion 124 may perform the wireless communication using at least one of UHF bands which do not need report or permission. For example, the wireless communication may be performed using UHF within a range of frequency band of 448 MHz or more and 449 MHz or less.

The power supply portion 125 may supply one or a plurality of batteries (not shown) disposed in the housing of the pager 120 under the control of the controlling portion 123. The one or the plurality of batteries supply power to the pager 120.

Also, the power supplied by the power supply portion 125 may be controlled according to a data reception method of the pager 120. The data reception method of the pager 120 will be described in detail with reference to following FIG. 5.

Also, the power supply portion 125 may supply power input from an external power source (not shown) to the pager 120 through a cable connected to the input/output terminal (not shown).

Also, the power supply portion 125 may supply power wirelessly input from the external power source to the pager 120 using a wireless charging technology.

The storage portion 126 may store various types of data necessary for an operation of the pager 120 and data transmitted and received through the wireless communication portion 124 under the control of the controlling portion 123.

Also, when an emergency bell signal is received from the wireless emergency bell 110, the storage portion 126 may transmit prestored alarm sound information to the controlling portion 123 under the controlling portion 123.

The controlling portion 123 may allow an operation mode of the pager 120 to enter a reception stand-by mode when the power of the pager 120 is applied. The reception stand-by mode may continue until data is received from the wireless emergency bell 110 positioned outside the pager 120 or the other pagers 120. A reception stand-by mode state of a general electronic apparatus (not shown) which performs wireless communication maintains an active state all the time to receive data from an external apparatus (not shown). However, a reception stand-by mode state of the pager 120 according to one embodiment of the present invention may include a sleep mode section and an auto-polling section. The reception stand-by mode state is configured as one period including the sleep mode section and the auto-polling section and may repeatedly perform the period until an emergency bell signal is received from the wireless emergency bell 110. The reception stand-by section may be maintained for a preset time, and the auto-polling section may be maintained for a setting time shorter than the preset time of the reception stand-by section. Accordingly, it is possible to further reduce power consumption than the reception stand-by mode which always operates in the active state. For example, the controlling portion 123 controls the power supplied from the power supply portion 125 to the wireless communication portion 124 according to the reception stand-by mode which includes the auto-polling section and the reception stand-by section to control power consumption in the reception stand-by mode of the pager 120.

Also, the controlling portion 123 may determine whether the emergency bell signal is received from the wireless emergency bell 110 through the wireless communication portion 124 while operating in the reception stand-by mode. As a result of the determination, when the emergency bell signal is received, the controlling portion 123 may extract prestored alarm sound information from the storage portion 126 and may generate and output an alarm sound signal from the extracted alarm sound information to the outside of the pager 120 through the speaker 121-3 for a preset setting time. When the emergency bell signal is not received, the controlling portion 123 may continuously maintain the reception stand-by mode.

After that, the controlling portion 123 may receive an emergency bell voice signal from the wireless emergency bell 110 through the wireless communication portion 124.

After that, the controlling portion 123 may output the received emergency bell voice signal to the outside of the pager 120 through the speaker 121-3 for a preset setting time.

After that, the controlling portion 123 may determine whether an emergency bell voice transmission completion signal is received from the wireless emergency bell 110 through the wireless communication portion 124. As a result of the determination, when the emergency bell voice transmission completion signal is not received, the controlling portion 123 may perform operations of receiving and outputting the emergency bell voice signal through the speaker 121-3.

When the emergency bell voice transmission completion signal is received, the controlling portion 123 may receive an input signal of a user through the button 121-1 provided at the input/output portion 121 and may determine whether transmission of a pager voice signal is necessary. As a result of the determination, when an input signal of the user indicates that the transmission of the pager voice signal is necessary, the controlling portion 123 may generate the pager voice signal including an electric signal generated from a voice or sound input through the provided microphone 121-2. The controlling portion 123 may repeatedly transmit the generated pager voice signal to the wireless emergency bell 110 or the other pagers 120 through the wireless communication portion 124.

After that, the controlling portion 123 may receive the input signal of the user through the button 121-1 provided at the input/output portion 121 and may determine whether reception of an emergency bell voice signal is necessary. As a result of the determination, when the input signal of the user indicates that the reception of the emergency bell voice signal is necessary, the controlling portion 123 may generate a mode conversion command signal and may transmit the generated mode conversion command signal to the wireless emergency bell 110 through the wireless communication portion 124. The mode conversion command signal may be generated while including information which gives commands for converting the operation mode of the wireless emergency bell 110 from the reception mode into the transmission mode. When the input signal of the user indicates that the reception of the emergency bell voice signal is unnecessary, the controlling portion 123 may convert the operation mode of the pager 120 into the reception stand-by mode.

Figure 5:
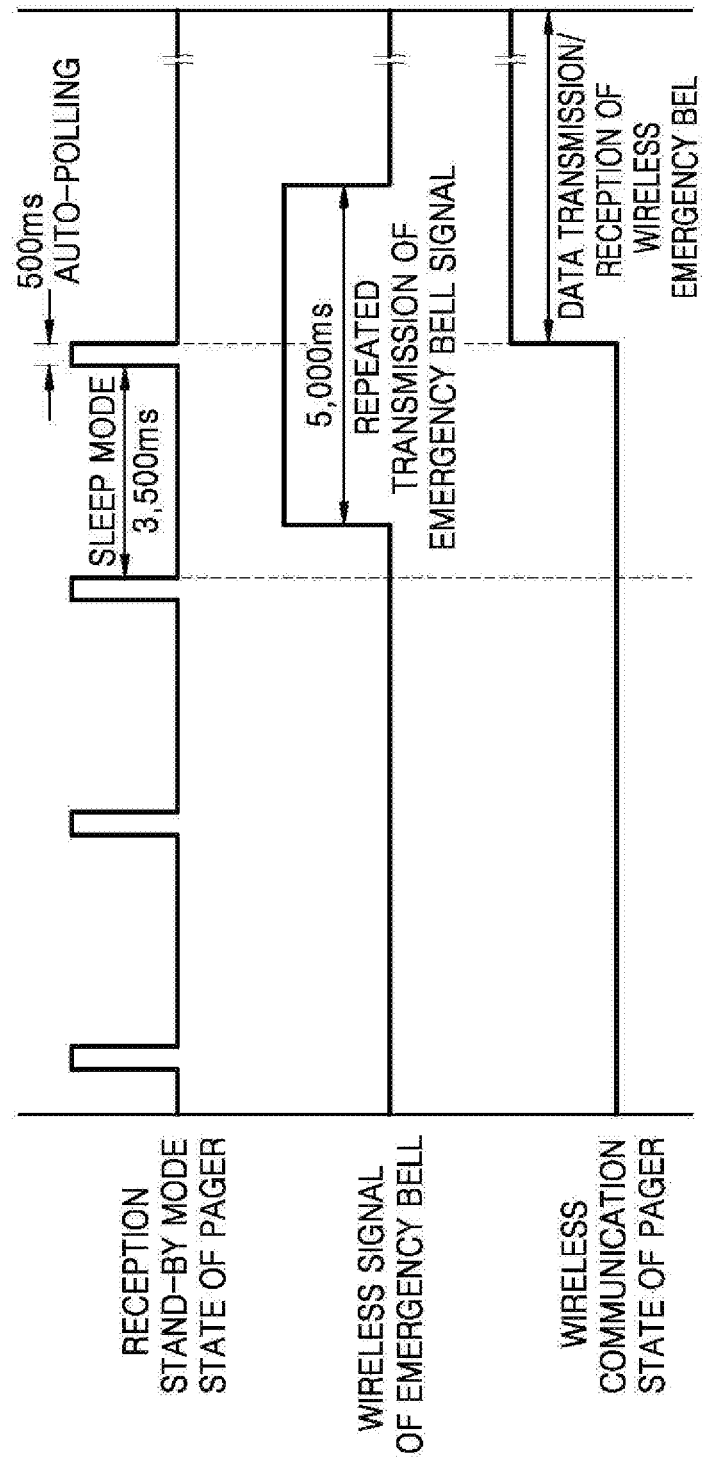
FIG. 5 is a view illustrating an example of a data reception method of the pager according to one embodiment of the present invention.

FIG. 5 is a view illustrating an example of the data reception method of the pager according to one embodiment of the present invention. Referring to FIG. 5, unlike a reception stand-by mode of a general electronic apparatus which performs wireless communication, the reception stand-by mode state of the data reception method of the pager 120 according to one embodiment of the present invention does not maintain an active state all the time, maintains a sleep mode for a preset setting time, and maintains auto-polling for a preset setting time shorter than the setting time in which the sleep mode is maintained. The reception stand-by mode of the pager 120 according to one embodiment of the present invention may include a sleep mode section and an auto-polling section. The reception stand-by mode of the pager 120 may have one period including the sleep mode section and the auto-polling section and may repeatedly perform the period until data is received from an external apparatus. For example, as shown in FIG. 5, the one period of the reception stand-by mode may include the setting time for maintaining the sleep mode is set as 3,500 ms and the setting time for maintaining the auto-polling is set as 500 ms and may be repeatedly until the emergency bell signal is received from the wireless emergency bell 110. The wireless emergency bell 110 may repeatedly transmit an emergency bell signal including emergency bell number information for 5,000 ms which is a preset setting time. Accordingly, since the time of 500 ms for maintaining the auto-polling in the reception stand-by mode of the pager 120 overlaps a range of 5,000 ms which is the setting time for transmitting the emergency bell signal, the pager 120 may receive the emergency bell signal transmitted from the wireless emergency bell 110 and then may transmit and receive data with the wireless emergency bell 110.

The pager 120 according to one embodiment of the present invention may further reduce power consumption for performing the reception stand-by mode using an auto-polling method compared with power consumption for a reception stand-by mode of operating in an active state all the time.

FIG. 6 is a view illustrating examples of the display portion of the pager according to one embodiment of the present invention which displays a corresponding wireless emergency bell when an emergency occurs. Referring to FIG. 6, the display portion 122 of the pager 120 may output emergency bell number texts 122-1 and 122-3 which indicate emergency bell number information included in an emergency bell signal received from the wireless emergency bell 110 and sequence texts 122-2 and 122-4 which indicate record information of the received emergency bell signal under the control of the controlling portion 123.

Also, the display portion 122 may output the emergency bell number texts and the sequence texts to be different in at least one of size, font, and color thereof under the control of the controlling portion 123 to allow a user to easily read.

Figure 6A:
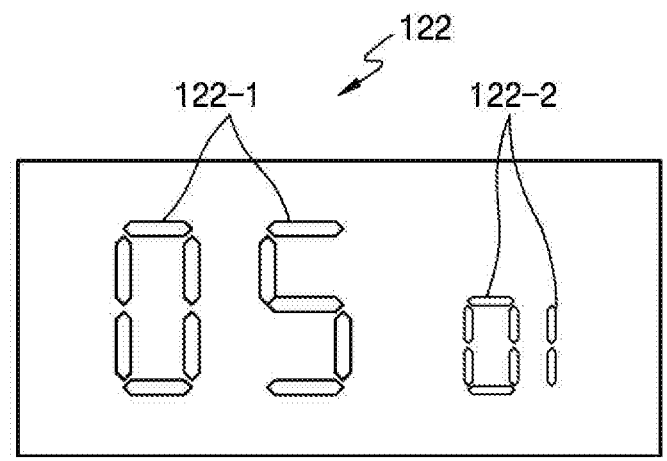
FIG. 6 is a view illustrating examples of a display portion of the pager according to one embodiment of the present invention which displays a corresponding wireless emergency bell when an emergency occurs.

As shown in FIG. 6(A), the display portion 122 may output the emergency bell number text 122-1 and the sequence text 122-2 to indicate that an emergency bell signal is first received from the wireless emergency bell 110 with an emergency bell number of 05 among the plurality of wireless emergency bells 110 under the control of the controlling portion 123.

Figure 6B:
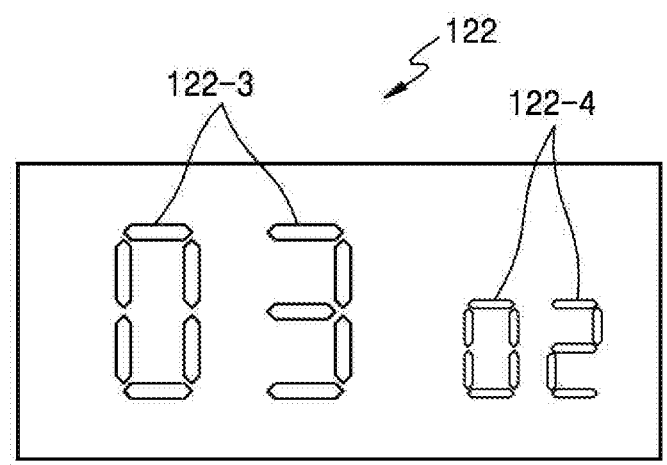

After that, when an emergency bell signal is received from the wireless emergency bell 110 with an emergency bell number of 03, as shown in FIG. 6(B), the display portion 122 may output the emergency bell number text 122-3 and the sequence text 122-4 to indicate that the emergency bell signal is first received from the wireless emergency bell 110 with the emergency bell number of 03 among the plurality of wireless emergency bells 110 under the control of the controlling portion 123. Since the sequence text 122-2 which has 01 (already exists, the sequence text 122-4 may be output while being set as 02. For example, a security officer may recognize an area in which an emergency occurs through the emergency bell number text 122-1 output on the display portion 122 of the pager 120. Also, the security officer may check the record of the area in which the emergency occurs through the sequence text 122-2. For example, the security officer may check the record of receiving the emergency bell signal by pushing the upper adjustment button and the lower adjustment button of the button 121-1 provided at the pager 120.

Figure 7:
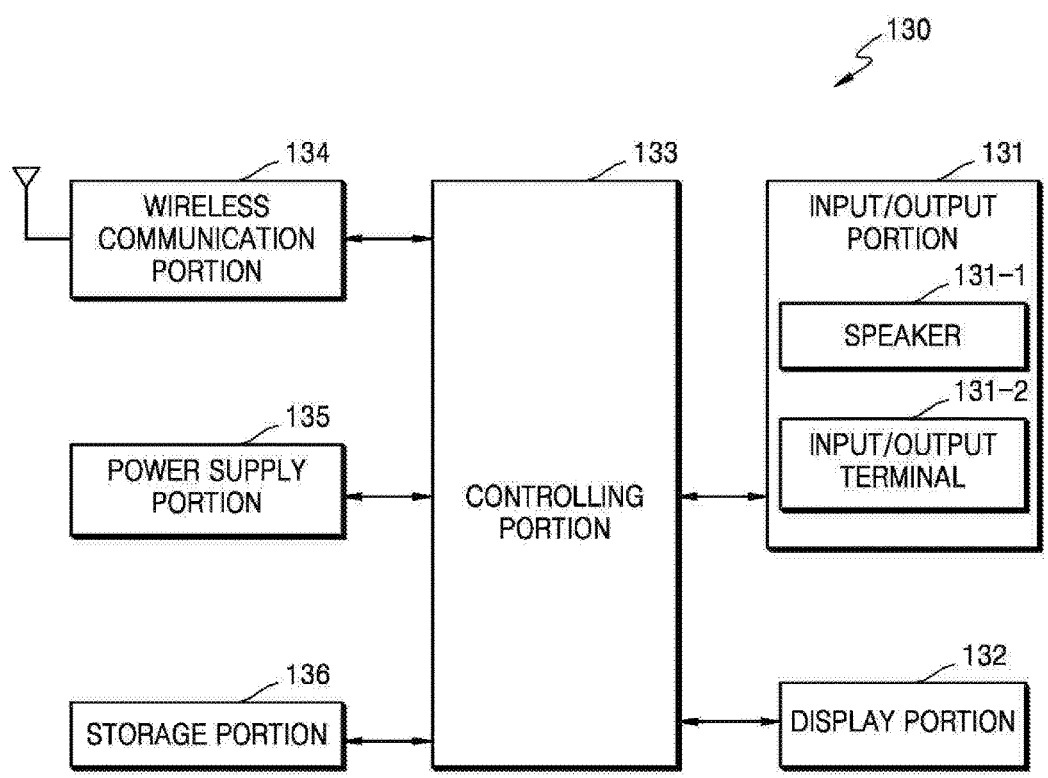
FIG. 7 is a block diagram of a receiver of the wireless emergency bell control system according to one embodiment of the present invention.

FIG. 7 is a block diagram of the receiver of the wireless emergency bell control system according to one embodiment of the present invention. Referring to FIG. 7, the receiver 130 may include an input/output portion 131, a display portion 132, a controlling portion 133, a wireless communication portion 134, a power supply portion 135, and a storage portion 136.

The input/output portion 131 may include at least one of a speaker 131-1 and an input/output terminal 131-2.

The speaker 131-1 may output an emergency bell voice signal received from the wireless emergency bell 110 to the outside of the receiver 130 under the control of the controlling portion 133.

Also, the speaker 131-1 may output an alarm sound prestored in the storage portion 136 to the outside of the receiver 130 under the control of the controlling portion 133. One or a plurality of such speakers 131-1 may be formed at an appropriate position or positions of a housing of the receiver 130.

The input/output terminal 131-2 may be used as an interface for connecting external apparatuses such as a CCTV camera controlling apparatus (not shown) or a power source (not shown) described with reference to FIG. 2.

The display portion 132 may output emergency bell number information included in the emergency bell signal received from the wireless emergency bell 110 as at least one of a text, a symbol, a figure, and an icon under the control of the controlling portion 133 to allow a user to recognize the emergency bell number information.

The wireless communication portion 134 may allow the receiver 130 to be connected to external apparatuses such as the wireless emergency bell 110 or other pagers 120 through wireless communication using at least one or a plurality of antennas under the control of the controlling portion 133

Also, the wireless communication portion 134 may receive at least one of an emergency bell signal and an emergency bell voice signal from the wireless emergency bell 110 under the control of the controlling portion 133.

Also, the wireless communication portion 134 may receive a pager voice signal from the pager 120 under the control of the controlling portion 133.

Also, the wireless communication portion 134 may receive the pager voice signals transmitted and received between the pagers 120 under the control of the controlling portion 123.

Also, the wireless communication portion 134 may perform the wireless communication using at least one of UHF bands which do not need report or permission. For example, the wireless communication may be performed using UHF within a range of frequency band of 448 MHz or more and 449 MHz or less.

The power supply portion 135 may supply one or a plurality of batteries (not shown) disposed in the housing of the receiver 130 under the control of the controlling portion 133. The one or the plurality of batteries supply power to the receiver 130.

Also, the power supply portion 135 may supply power input from an external power source (not shown) to the receiver 130 through a cable connected to the input/output terminal 131-2

Also, the power supply portion 135 may supply power wirelessly input from the external power source to the receiver 130 using a wireless charging technology.

The storage portion 136 may store various types of data necessary for an operation of the receiver 130 and data transmitted and received through the wireless communication portion 134 under the control of the controlling portion 133.

Also, when an emergency bell signal is received from the wireless emergency bell 110, the storage portion 136 may transmit prestored alarm sound information to the controlling portion 133 under the controlling portion 133.

After that, the controlling portion 133 may receive an emergency bell signal from the wireless emergency bell 110 through the wireless communication portion 134. The controlling portion 133 may extract emergency bell number information included in the received emergency bell signal and may output the extracted emergency bell information to the provided display portion 132. A method of displaying the received emergency bell signal performed by the controlling portion 133 of the receiver 130 will be described in detail with reference to following FIG. 8.

Also, when the emergency bell signal is received, the controlling portion 133 may extract the emergency bell number information included in the received emergency bell signal.

Also, when identification information of a reporter is included in the received emergency bell signal, the controlling portion 133 may extract the identification information of the reporter.

Also, the controlling portion 133 may display the extracted emergency bell number information or identification information of the reporter as at least one of a text, a symbol, a figure, and an icon on the provided display portion to allow a security officer to recognize.

Also, when the emergency bell signal is received from the wireless emergency bell 110, the controlling portion 133 may extract the emergency bell number information included in the received emergency bell signal and may generate an image storage command signal including at least one of the extracted emergency bell number information and a setting range time. The controlling portion 133 may transmit the generated image storage command signal to the CCTV camera controlling apparatus through a cable connected to the input/output terminal 131-2 provided at the input/output portion 131 or wirelessly. When the image storage command signal is received, the CCTV camera controlling apparatus may extract the emergency bell number information from the received image storage command signal and may control at least one of pan, tilt, and zoom functions of a CCTV camera (not shown) in an area in which an emergency occurs to recognize the area and record image information within a preset setting range time based on a time when the image storage command signal is received among the image information transmitted from the CCTV camera installed in the corresponding area. Also, the setting range time may be preset by the user or the manufacturer of the wireless emergency bell control system 100 or 200.

After that, to allow a worker in a situation room (for example, a teachers' room or a management office) in which the receiver 130 is installed to recognize that the emergency occurs, the controlling portion 133 may extract alarm sound information prestored in the storage portion 136 and may output an alarm sound signal from the extracted alarm sound information to the outside of the receiver 130 through the speaker 131-1 provided at the input/output portion 131.

After that, the controlling portion 133 may receive an emergency bell voice signal from the wireless emergency bell 110 through the wireless communication portion 134. The controlling portion 133 may output the received emergency bell voice signal to the outside of the receiver 130 through the provided speaker 131-1.

Also, the controlling portion 133 may receive a pager voice signal from the pager 120 through the wireless communication portion 134. The controlling portion 133 may output the received pager voice signal to the outside of the receiver 130 through the provided speaker 131-1.

Also, the controlling portion 133 may receive pager voice signals transmitted and received between the pagers 120 through the wireless communication portion 134. The controlling portion 133 may output the received pager voice signal to the outside of the receiver 130 through the provided speaker 131-1.

Figure 8A:
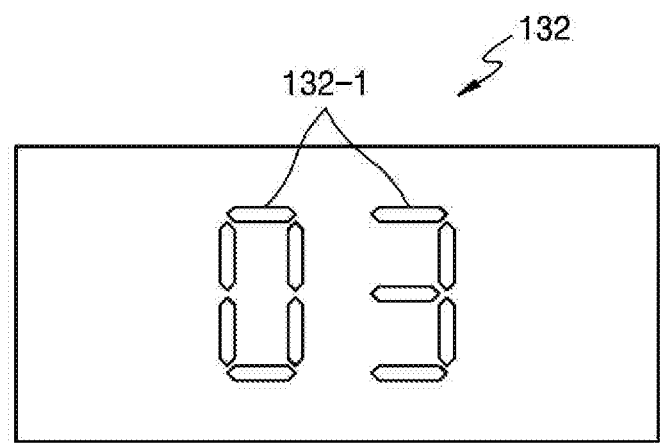
FIG. 8 is a view illustrating examples of a display portion of the receiver according to one embodiment of the present invention which displays a corresponding wireless emergency bell when an emergency occurs.

FIG. 8 is a view illustrating examples of the display portion of the receiver according to one embodiment of the present invention which displays a corresponding wireless emergency bell when an emergency occurs. Referring to FIG. 8(A), the display portion 132 of the receiver 130 according to one embodiment of the present invention may output an emergency bell number text 132-1 which indicates emergency bell number information included in an emergency bell signal received from the wireless emergency bell 110 under the control of the controlling portion 133.

Figure 8B:
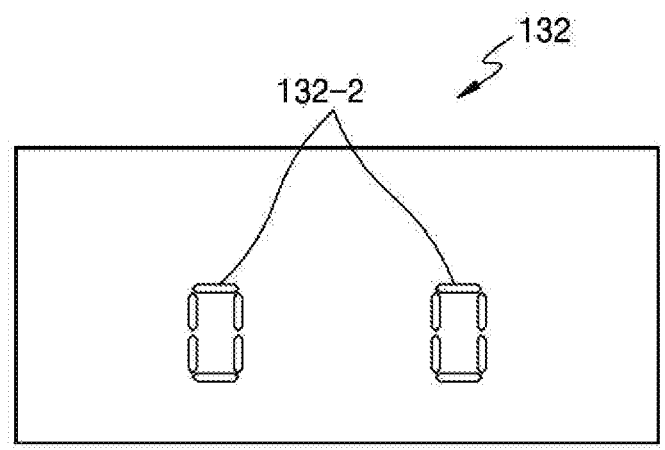

Referring to FIG. 8(B), when wireless communication is performed between the pagers 120, the controlling portion 133 according to one embodiment of the present invention may generate communication between pagers display information which indicates that communication is performed between the pagers 120. The controlling portion 133 may control the display portion 132 to output the generated communication between pagers display information as communication between pagers display 132-2. For example, the worker in the situation room (for example, the teachers' room or the management office) in which the receiver 130 is installed may recognize the area in which the emergency occurs through the emergency bell number text 132-1 output on the display portion 132 of the receiver 130. After that, the worker in the situation room may check the content of communication between security officers through the communication between pagers display 132-2 output one the display portion 132 of the receiver 130. Accordingly, the worker in the situation room may totally manage the emergency.

Meanwhile, the elements of each of the wireless emergency bell control systems 100 and 200 are separately shown in the drawings to indicate that they may be functionally and logically separated and it does not mean that the elements are sure to be physically separate elements or embodied as separate codes.

Also, throughout the specification, each functional portion may mean functional and structural coupling between hardware for performing the technical concept of the present invention and software for driving the hardware. For example, one of ordinary skill in the art may easily conceive that the each functional portion may refer a certain code and a logical unit of a hardware resource for executing the certain code and does not mean a code sure to be physically connected code or one kind of hardware.

Hereinafter, a wireless emergency bell control method according to one embodiment of the present invention will be described with reference to the attached drawings.

Figure 9:
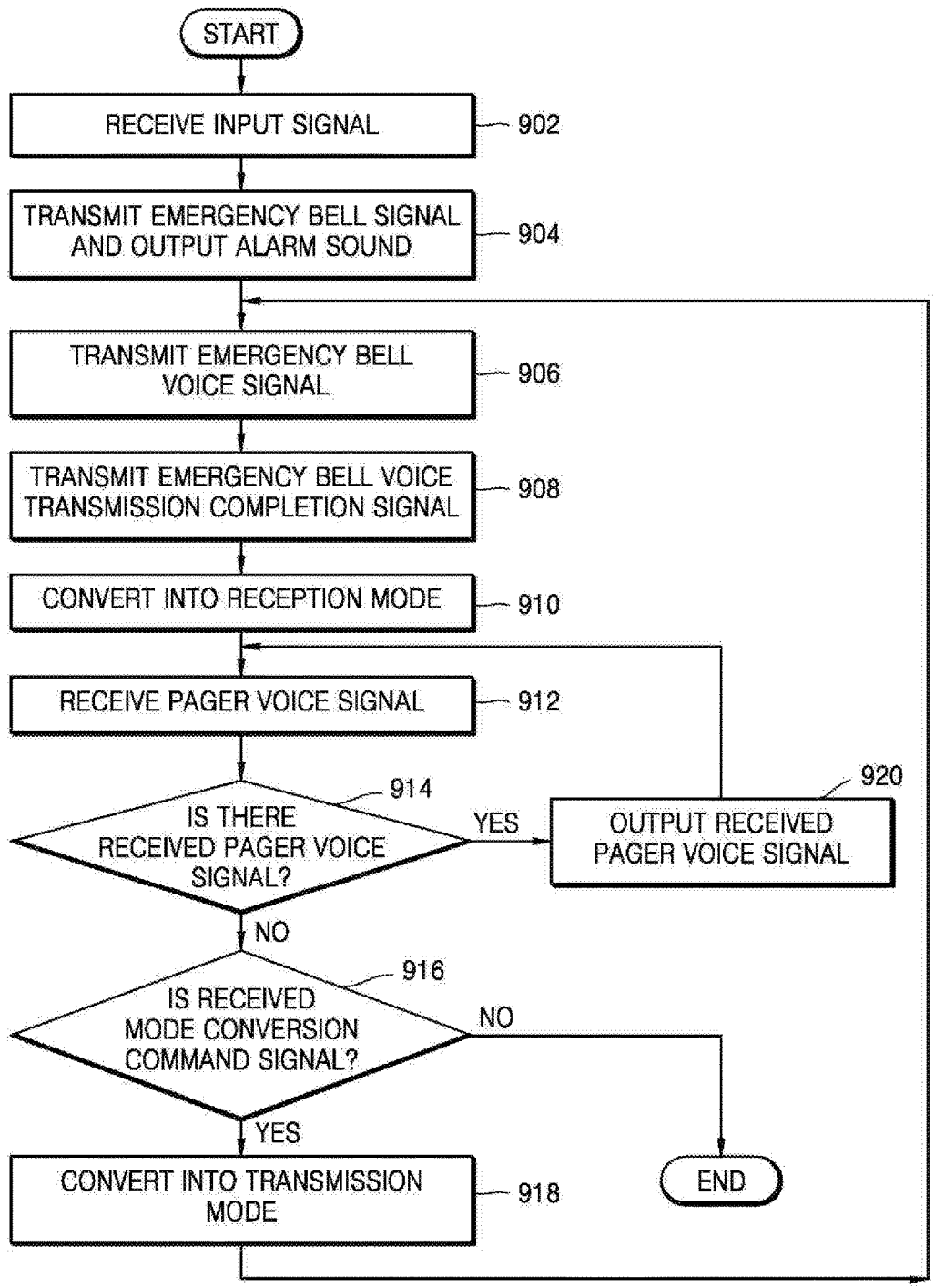
FIG. 9 is a flowchart illustrating operations of the wireless emergency bell of the wireless emergency bell control system according to one embodiment of the present invention.

FIG. 9 is a flowchart illustrating operations of the wireless emergency bell of the wireless emergency bell control system according to one embodiment of the present invention. Referring to FIG. 9, the controlling portion 112 of the wireless emergency bell 110 according to one embodiment of the present invention may receive an input signal which indicates that an emergency occurs through an operation of pushing the provided button 111-1 (902). For example, when the emergency occurs, a reporter may report that the emergency occurs by pushing the button 111-1 provided at the wireless emergency bell 110.

Also, when the RF tag is recognized by the provided RF reader, the controlling portion 112 may receive the input signal which indicates that the emergency occurs.

Also, when the NFC tag is recognized by the provided NFC reader, the controlling portion 112 may receive the input signal which indicates that the emergency occurs.

After that, the controlling portion 112 may generate an emergency bell signal, may repeatedly transmit the generated emergency bell signal to the pager 120 or the receiver 130 through the wireless communication portion 113 for a preset setting time, and may output a prestored alarm sound through the provided speaker 111-3 for a preset setting time (904).

After that, the controlling portion 112 may generate and transmit an emergency bell voice signal to the pager 120 or the receiver 130 (906). The emergency bell voice signal may be generated including an electric signal generated from a voice or sound received by the controlling portion 112 input through the provided microphone 111-2. After that, the controlling portion 112 may generate and transmit an emergency bell voice transmission completion signal which indicates that transmission of the emergency bell voice signal is completed to the pager 120 or the receiver 130 through the wireless communication portion 113 (908).

After that, the controlling portion 112 may automatically convert an operation of the wireless emergency bell 110 into a reception mode after a preset setting time (910). The reception mode is a mode which allows the wireless emergency bell 110 to receive data transmitted from the pager 120 through the wireless communication portion 113. The setting time may be preset by a manufacturer or a user.

After that, the controlling portion 112 may receive a pager voice signal from the pager 120 through the wireless communication portion 113 (912). The pager voice signal is a signal including an electric signal generated from a voice or sound input through the microphone provided in the pager 120.

After that, the controlling portion 112 may determine whether the received pager voice signal is present (914). As a result of the determination, when the received pager voice signal is present, the controlling portion 112 may output the received pager voice signal to the outside of the wireless emergency bell 110 through the speaker 111-3 and then may return to the operation 912 to perform.

When the received pager voice signal is not present, the controlling portion 112 may determine whether a mode conversion command signal is received from the pager 120 (916). When the mode conversion command signal is received, the controlling portion 112 may convert the operation mode of the wireless emergency bell 110 from the reception mode into a transmission mode 918 and then may return to the operation 906 to perform.

When the mode conversion command signal is not received, the controlling portion 112 may finish the operation of the wireless emergency bell 110.

Figure 10:
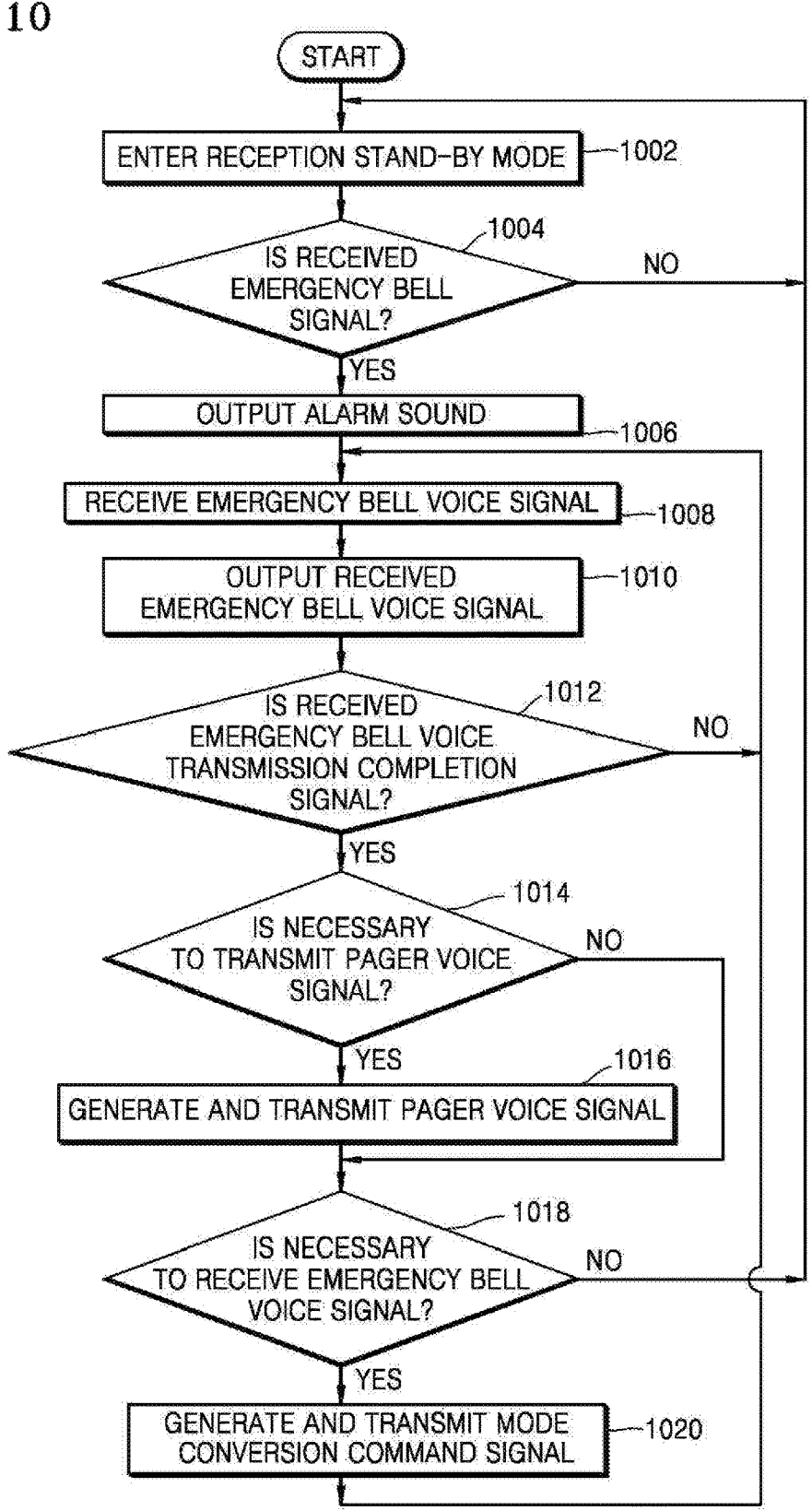
FIG. 10 is a flowchart illustrating operations of the pager of the wireless emergency bell control system according to one embodiment of the present invention.

FIG. 10 is a flowchart illustrating operations of the pager of the wireless emergency bell control system according to one embodiment of the present invention. Referring to FIG. 10, when power of the pager 120 is applied, the controlling portion 123 of the pager 120 according to one embodiment of the present invention may allow an operation mode of the pager 120 to enter a reception stand-by mode (1002). The reception stand-by mode may continue until data is received from the wireless emergency bell 110 positioned outside the pager 120 or the other pagers 120.

Also, the controlling portion 123 may operate in a sleep mode for a preset setting time.

Also, after the setting time is finished, the controlling portion 123 may operate auto-polling for a preset setting time.

Also, the controlling portion 123 may repeatedly perform the sleep mode and the auto-polling.

After that, the controlling portion 123 may determine whether the emergency bell signal is received from the wireless emergency bell 110 through the wireless communication portion 124 while operating in the reception stand-by mode (1004). As a result of the determination, when the emergency bell signal is received, the controlling portion 123 may extract prestored alarm sound information from the storage portion 126 and may generate and output an alarm sound signal from the extracted alarm sound information to the outside of the pager 120 through the speaker 121-3 for a preset setting time (1006). When the emergency bell signal is not received, the operation 1002 may be performed.

Also, when the emergency bell signal is received, the controlling portion 123 may extract emergency bell number information included in the received emergency bell signal.

Also, when identification information of a reporter is included in the received emergency bell signal, the controlling portion 123 may extract the identification information of the reporter.

Also, the controlling portion 123 may display the extracted emergency bell number information or identification information of the reporter as at least one of a text, a symbol, a figure, and an icon on the provided display portion to allow a security officer to recognize.

Also, when a plurality of such emergency bell signals are received, the controlling portion 123 may extract the emergency bell number information included in the plurality of received emergency bell signals in a reception order.

Also, the controlling portion 123 may generate an emergency bell number text which indicates the extracted emergency bell number information and a sequence text which indicates the reception order.

Also, to allow the security officer to recognize, the controlling portion 123 may display the generated emergency bell number text and the generated sequence text together to be different in at least one of size, font, and color on the provided display portion.

After that, the controlling portion 123 may receive an emergency bell voice signal from the wireless emergency bell 110 through the wireless communication portion 124 (1008).

After that, the controlling portion 123 may output the received emergency bell voice signal to the outside of the pager 120 through the speaker 121-3 (1010). After that, the controlling portion 123 may determine whether an emergency bell voice transmission completion signal is received from the wireless emergency bell 110 through the wireless communication portion 124 (1012). As a result of the determination, when the emergency bell voice transmission completion signal is not receive, the controlling portion 123 may return to the operation 1008 to perform.

When the emergency bell voice transmission completion signal is received, the controlling portion 123 may receive an input signal of a user through the button 121-1 provided at the input/output portion 121 and may determine whether transmission of a pager voice signal is necessary (1014). As a result of the determination, when the input signal of the user indicates that the transmission of the pager voice signal is necessary, the controlling portion 123 may generate the pager voice signal including an electric signal generated from a voice or sound input through the provided microphone 121-2 and may transmit the generated pager voice signal to at least one of the wireless emergency bell 110, the other pagers 120, and the receiver 130 through the wireless communication portion 124 (1016).

When the input signal of the user which indicates that the transmission of the pager voice signal is necessary is not received, following operation 1018 may be performed.

After that, the controlling portion 123 may receive the input signal of the user through the button 121-1 provided at the input/output portion 121 and may determine whether reception of an emergency bell voice signal is necessary (1018). As a result of the determination, when the input signal of the user indicates that the reception of the emergency bell voice signal is necessary, the controlling portion 123 may generate a mode conversion command signal and may transmit the generated mode conversion command signal to the wireless emergency bell 110 through the wireless communication portion 124 (1020). The mode conversion command signal may be generated while including information which gives commands for converting the operation mode of the wireless emergency bell 110 from the reception mode into the transmission mode.

When the input signal of the user indicates that the reception of the emergency bell voice signal is unnecessary, the controlling portion 123 may return to the operation 1002 to perform.

Meanwhile, the wireless emergency bell control method according to embodiments of the present invention described above may be embodied as a program command form capable of being executed through various computer means and may be recorded in a computer-readable medium. The computer-readable medium may include a program command, a data file, a data structure, etc. singularly or a combination thereof. The program command recorded in the medium may be particularly designed or configured for the present invention or may be well-known to those skilled in the art of computer software to be usable. A computer-readable recording medium, for example, includes magnetic media such as a hard disk, a floppy disk, and a magnetic tape, optical media such as a CD-ROM and a DVD, magneto-optical media such as a floptical disk, and hardware devices particularly configured to store and execute a program command such as an ROM, an RAM, a flash memory, an HDD, a micro SD card, an USB memory, etc. The program command, for example, includes not only machine language codes manufactured by a compiler but also high-level language codes executable by a computer using an interpreter, etc. The hardware device may be configured to operate as at least one software module for performing the operations of the present invention and the inverse thereof is the same.

As described above, specified features such as detailed elements, etc. and limited embodiments of the present invention have been described with reference to the drawings to provide more general understandings of the present invention. However, the present invention is not limited to the above embodiments and may be variously changed and modified by one of ordinary skill in the art from the above description.

Accordingly, the concept of the present invention should not be limited to the embodiments described above and the scope of the present invention should be defined by the following claims and equivalents thereof.

INDUSTRIAL APPLICABILITY

The present invention may be generally applied to the field of emergency bell systems.

The invention claimed is:

1. A method of controlling a wireless emergency bell system comprising at least one wireless emergency bell, the method comprising:
receiving a first input signal generated by a reporter pushing a button of the wireless emergency bell when an emergency occurs;
generating and repeatedly transmitting an emergency bell signal to at least one pager and a receiver for a preset setting time;
outputting a prestored alarm sound to an outside through a provided speaker;
generating and transmitting an emergency bell voice signal to the at least one pager and the receiver;
generating and transmitting an emergency bell voice transmission completion signal which indicates that transmission of the emergency bell voice signal is completed to the at least one pager and the receiver;
converting an operation of the wireless emergency bell into a reception mode after a preset setting time for receiving a mode conversion command signal or data from the at least one pager and the receiver after transmitting the emergency bell voice transmission completion signal;
receiving a pager voice signal from the at least one pager;
determining whether the received pager voice signal is present and outputting the received pager voice signal to the outside through the speaker when the received pager voice signal is present; and
determining whether the mode conversion command signal is received from the at least one pager when the received pager voice signal is not present and converting the operation into a transmission mode capable of transmitting data to the at least one pager and the receiver when the received mode conversion command signal is present,
wherein the determining whether the mode conversion command signal is received from the at least one pager further comprising:
determining, via a controller of the at least one pager, whether reception of a subsequent emergency bell voice signal is necessary by receiving a second input signal of a user through a button provided in the at least one pager which indicates that the subsequent emergency bell voice signal is desired;
generating, via the controller, the mode conversion command signal and transmitting the generated mode conversion command signal to the wireless emergency bell in response to the emergency bell voice transmission completion signal being received from the wireless emergency bell for converting the operation of the wireless emergency bell from the reception mode into the transmission mode when the second input signal of the user indicates that the reception of the subsequent emergency bell voice signal is necessary.

2. The method of claim 1, wherein the receiving of the first input signal further comprises:
receiving the first input signal input by the reporter by recognizing a radio frequency (RF) tag by an RF reader provided at the wireless emergency bell or by recognizing a near field communication (NFC) tag by an NFC reader provided at the wireless emergency bell.

3. The method of claim 2, wherein the emergency bell signal is generated while comprising at least one of identification information of the reporter included in the RF tag and identification information of the reporter included in the NFC tag.

4. The method of claim 1, wherein the emergency bell signal is generated while comprising wireless emergency bell number information prestored in a storage portion provided at the wireless emergency bell to allow a security officer to recognize an area where the emergency occurs.

5. The method of claim 1, wherein the emergency bell voice signal is generated from a voice and sound input through a microphone provided at the wireless emergency bell.

6. The method of claim 1, wherein the mode conversion command signal is a signal comprising information which gives commands for converting the wireless emergency bell which operates in the reception mode into the transmission mode.

7. The method of claim 1, wherein the at least one wireless emergency bell, the at least one pager, and the receiver mutually communicate using at least one of ultrahigh frequency (UHF) bands which do not need report or permission.

8. The method of claim 7, wherein the UHF band has a frequency band range of 448 MHz or more and 449 MHz or less.

9. The method of claim 1, wherein the receiving of the first input signal further comprises:
generating an image storage command signal comprising information which indicates a command for storing an image taken by a camera installed in an area from which the first input signal is received; and
transmitting the generated image storage command signal to the camera connected through wires or wirelessly.

10. A method of controlling a wireless emergency bell system comprising a wireless emergency bell and at least one pager, the method comprising:
- entering, via a controller of the at least one pager, a reception stand-by mode for receiving data from the wireless emergency bell or other pagers;
- determining, via the controller, whether an emergency bell signal which indicates that an emergency occurs is received from the wireless emergency bell and outputting a preset alarm sound to an outside through a provided speaker when the emergency bell signal is received;
- receiving, via the controller, an emergency bell voice signal from the wireless emergency bell and outputting the emergency bell voice signal to the outside through the speaker;
- determining, via the controller, whether an emergency bell voice transmission completion signal which indicates that transmission of the emergency bell voice signal is completed is received from the wireless emergency bell, and when the emergency bell voice transmission completion signal is received, receiving an input signal of a user which indicates that a pager voice signal will be received and determining whether transmission of the pager voice signal is necessary,
- wherein after transmitting the emergency bell voice transmission completion signal to the at least one pager, the wireless emergency bell converts an operation into a reception mode after a preset setting time for receiving a mode conversion command signal or the pager voice signal from the at least one pager;
- generating and transmitting, via the controller, the pager voice signal to at least one of the wireless emergency bell, the other pagers, and a receiver when the transmission of the pager voice signal is necessary;
- determining, via the controller, whether reception of a subsequent emergency bell voice signal is necessary by receiving a subsequent input signal of the user through a button provided in the at least one pager which indicates that the subsequent emergency bell voice signal is desired; and
- generating, via the controller, the mode conversion command signal and transmitting the generated mode conversion command signal to the wireless emergency bell in response to the emergency bell voice transmission completion signal being received from the wireless emergency bell for converting the operation of the wireless emergency bell from the reception mode into a transmission mode capable of transmitting data to the at least one pager when the subsequent input signal of the user indicates that the reception of the subsequent emergency bell voice signal is necessary.

11. The method of claim 10, wherein the entering of the reception stand-by mode further comprises:
- operating in a sleep mode for a preset setting time;
- operating, after the setting time is finished, in auto-polling for a preset setting time; and
- repeatedly performing the sleep mode and the auto-polling.

12. The method of claim 10, wherein the at least one pager further performs:
- extracting emergency bell number information included in the emergency bell signal when the emergency bell signal is received;
- extracting identification information of the reporter when the identification information of the reporter is included in the received emergency bell signal; and
- displaying the extracted emergency bell number information or the extracted identification information of the reporter on a provided display portion to allow a security officer to recognize.

13. The method of claim 12, wherein the displaying through the display portion is displaying as at least one of a text, a symbol, a figure, and an icon.

14. The method of claim 10, wherein the at least one pager further performs:
- extracting, when a plurality of such emergency bell signals are received, each piece of emergency bell number information included in the plurality of emergency bell signals in a reception order;
- generating an emergency bell number text which indicates the extracted each piece of emergency bell number information and a sequence text which indicates the reception order; and
- displaying the generated emergency bell number text and the generated sequence text to be different in at least one of size, font, and color through a provided display portion.

15. The method of claim 10, wherein the input signal or the subsequent input signal of the user is generated by pushing one of a plurality of buttons provided at the pager.

16. The method of claim 10, wherein the wireless emergency bell, the at least one pager, and the receiver mutually communicate using at least one of UHF bands which do not need report or permission.

17. The method of claim 16, wherein the UHF band has a frequency band range of 448 MHz or more and 449 MHz or less.

18. A method of controlling a wireless emergency bell system comprising a wireless emergency bell, at least one pager and a receiver, the method comprising:
- outputting a prestored alarm sound to an outside through a speaker of the pager when a controller of the at least one pager determines that an emergency bell signal is received from the wireless emergency bell;
- receiving, via the controller, an emergency bell voice signal from the wireless emergency bell and outputting the received emergency bell voice signal to the outside through the speaker;
- receiving, via the controller, a pager voice signal from at least one pager which wirelessly communicates with the wireless emergency bell and outputting the received pager voice signal to the outside through the speaker;
- receiving, via the controller, an emergency bell voice transmission completion signal from the wireless emergency bell,
- wherein after transmitting the emergency bell voice transmission completion signal to the at least one pager, the wireless emergency bell converts an operation into a reception mode after a preset setting time for receiving a mode conversion command signal or the pager voice signal from the at least one pager;
- receiving, via the controller, an input signal of a user through a button provided in the pager and determining whether reception of a subsequent emergency bell voice signal is necessary; and
- generating, via the controller, the mode conversion command signal and transmitting the generated mode conversion command signal to the wireless emergency bell in response to the emergency bell voice transmission completion signal being received from the wireless emergency bell for converting an operation of the wireless emergency bell from the reception mode into a transmission mode capable of transmitting data to the at least one pager when the input signal of the user indicates that the reception of the subsequent emergency bell voice signal is necessary.

19. The method of claim 18, wherein the receiver further performs:
   extracting, when the emergency bell signal is received, emergency bell number information included in the emergency bell signal and displaying the extracted emergency bell number information on a provided display portion to allow a security officer to recognize;
   generating an image storage command signal comprising information which indicates a command for storing an image taken by a closed-circuit television (CCTV) camera installed in an area in which the wireless emergency bell is positioned; and
   transmitting the generated image storage command signal to a CCTV camera controlling apparatus which controls the CCTV camera which is connected through wires or wirelessly.

20. The method of claim 18, wherein the receiver further performs:
   extracting emergency bell number information included in the emergency bell signal when the emergency bell signal is received;
   extracting identification information of a reporter when the identification information of the reporter is included in the received emergency bell signal; and
   displaying the extracted emergency bell number information or the extracted identification information of the reporter on a provided display portion to allow a security officer to recognize.

21. The method of claim 20, wherein the displaying through the display portion is displaying as at least one of a text, a symbol, a figure, and an icon.

22. The method of claim 18, wherein the wireless emergency bell, the at least one pager, and the receiver mutually communicate using at least one of UHF bands which do not need report or permission.

23. The method of claim 22, wherein the UHF band has a frequency band range of 448 MHz or more and 449 MHz or less.

24. A non-transitory computer-readable recording medium in which a program for executing each operation of the method according to claim 1 is recorded.

25. A wireless emergency bell control system comprising the non-transitory computer-readable recording medium of claim 24.

* * * * *